US006779737B2

(12) United States Patent
Murray et al.

(10) Patent No.: US 6,779,737 B2
(45) Date of Patent: Aug. 24, 2004

(54) VEHICLE COMPARTMENT AND ENGINE PREHEATING SYSTEM AND METHOD

(75) Inventors: Paul Raymond Murray, Ann Arbor, MI (US); Cindy Marie Rutyna, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 201 days.

(21) Appl. No.: 10/113,019

(22) Filed: Mar. 29, 2002

(65) Prior Publication Data

US 2003/0183184 A1 Oct. 2, 2003

(51) Int. Cl.[7] .............................................. G05D 23/00
(52) U.S. Cl. .................................. 237/2 A; 237/12.3 R
(58) Field of Search ........................... 237/2 A, 12.3 C, 237/12.3 R, 12.3 B, 28

(56) References Cited

U.S. PATENT DOCUMENTS

| | | | |
|---|---|---|---|
| 4,518,032 A | * | 5/1985 | Funasaki et al. ............. 165/202 |
| 4,773,588 A | * | 9/1988 | Okada ......................... 237/2 A |
| 4,836,444 A | * | 6/1989 | Kawamura ................... 237/2 A |
| 5,063,513 A | * | 11/1991 | Shank et al. ................. 701/36 |
| 5,280,158 A | | 1/1994 | Matava et al. |
| 5,350,114 A | * | 9/1994 | Nelson et al. ............... 237/2 A |
| 5,366,150 A | * | 11/1994 | Kaimoto et al. ............. 237/2 A |
| 5,469,819 A | | 11/1995 | Berger et al. |
| 5,791,407 A | | 8/1998 | Hammons |
| 5,806,479 A | | 9/1998 | Bauer et al. |

* cited by examiner

*Primary Examiner*—Derek S. Boles
(74) *Attorney, Agent, or Firm*—Brinks Hofer Gilson & Lione (57) ABSTRACT

The present invention involves a system and method of preheating a vehicle engine during non-use of the vehicle. The method includes receiving a programming input defining a minimum engine coolant temperature of a preheating strategy, initializing the preheating strategy based on the programming input, and sensing an energy source of the vehicle to run the preheating strategy. The method further comprises sensing an engine coolant temperature of the vehicle at a first time period, activating the preheating strategy to heat the engine if the engine coolant temperature is lower than the minimum engine temperature. The method further includes receiving feedback indicating the engine coolant temperature at a subsequent time period and deactivating the preheating strategy if the engine coolant temperature is greater than the maximum temperature at the subsequent time period.

9 Claims, 6 Drawing Sheets

VEHICLE COMPARTMENT AND ENGINE PREHEATING SYSTEM AND METHOD

BACKGROUND OF THE INVENTION

The present invention is related to a system and method of preheating a vehicle during non-use of the vehicle.

Year after year, the automotive industry continues to provide improved vehicle performances. Vehicle engine and engine performance continue to be developed and improved by vehicle manufacturers and designers. For instance, vehicle manufacturers are continuously challenged in improving engine startup performances. At startup temperatures, fuel for a vehicle engine is injected therein by spraying, but typically is in liquid or droplet phase when initially contacting a cylinder wall of the vehicle engine. Since liquid gasoline does not readily vaporize, this makes it difficult to start the engine properly. Once the engine is started, unvaporized fuel does not easily burn. This happens since the liquid fuel will typically cascade across a combustion chamber once an intake valve is opened, and contact the cold cylinder wall without participating in the combustion event. Thus, this may allow undesirable emissions to escape through the system and into the atmosphere. This may provide difficulty in starting the vehicle and may compromise fuel efficiency thereof. Moreover, at startup temperatures, engine oil may have relatively high viscosity. This may provide difficulty in lubricating bearing surfaces of the vehicle engine. Furthermore, at startup temperatures, the vehicle compartments may be undesirably cold for a driver, and windows may need defrosting.

BRIEF SUMMARY OF THE INVENTION

The present invention provides a vehicle heating system and method of preheating a vehicle engine and compartment during non-use of the vehicle. The present invention includes a vehicle heating system having a powertrain control module (PCM) with a microprocessor programmed to activate the vehicle heating system when the engine temperature falls below a predetermined temperature. The PCM activates the vehicle heating system to heat the engine and compartment. The PCM is in electrical communication with a driver interface for programming a desired in-cabin temperature of the vehicle compartment. The PCM is also in electrical communication with fluid heater for preheating the vehicle engine and compartment. The present invention preheats the engine by pumping and heating engine oil and engine coolant through the engine by the fluid heater. When the coolant reaches a desired temperature, the coolant is passed through a heater core. Air is blown across the heater core toward the air/defroster ducts so that heat may be exchanged and provided in the vehicle compartment.

Further aspects, features and advantages of the invention will become apparent from consideration of the following description and the appended claims when taken in connection with the accompanying drawings.

DETAILED DESCRIPTION OF THE INVENTION

Figure 1:
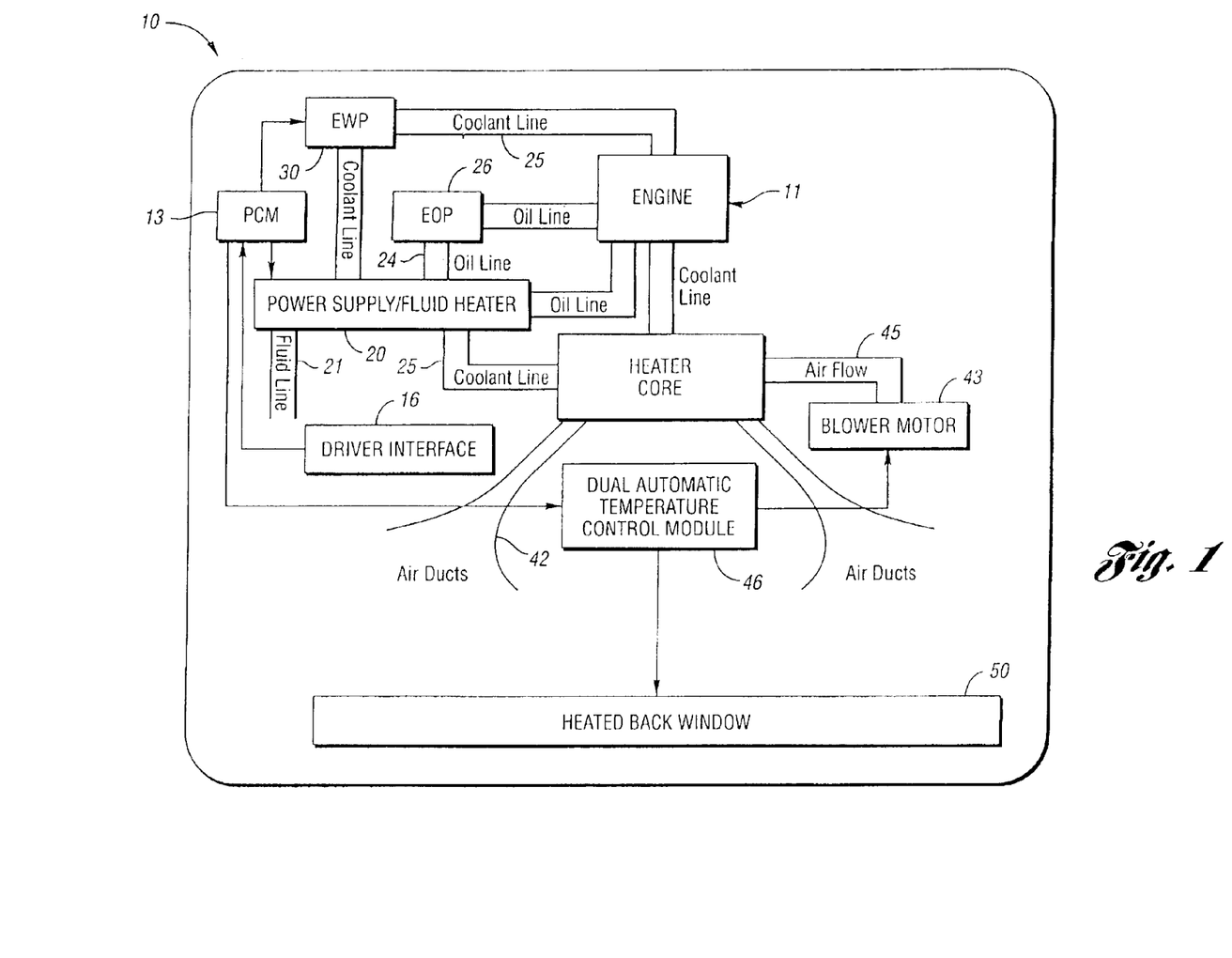
FIG. 1 is a schematic view of one embodiment of a vehicle having a vehicle heating system in accordance with the present invention.

FIG. 1 illustrates a vehicle 10 having a vehicle heating system 11 for preheating a vehicle engine and compartment during non-use of the vehicle. As shown, system 11 includes a powertrain control module (PCM) 13 which has a microprocessor programmed with a method or algorithm to preheat the vehicle engine and compartment during non-use of the vehicle. As shown, a driver interface 16 is in electrical communication with PCM 13 and has a face (not shown) which is accessible to a driver or an occupant for programming an intelligent vehicle heating strategy of the system 11. In this embodiment, the face is preferably located in the vehicle compartment to allow the driver or occupant of the vehicle to program the system 11 for preheating the vehicle engine and compartment under a set of parameters.

System 11 further includes a power supply/fluid heater 20 in electrical communication with PCM 13 and in fluid communication with a fuel system (not shown) of the vehicle via a fuel line 21. In this embodiment, fluid heater 20 may be any suitable gas fired heater, and power supply system which is fueled by gasoline and allows fluid, e.g., oil, water, or coolant, to be passed therethrough for heating. In this embodiment, the fluid heater 20 is fueled by vehicle fuel from the fuel tank of the vehicle via fuel lines 21. In this embodiment, fuel is pumped through fuel lines 21 by any suitable electric fuel pump (not shown) which may be in fluid communication between the fluid heater and the fuel tank of the vehicle. As described in greater detail below, fluid heater 20 receives heater signals from PCM 13 to heat engine oil and coolant for preheating the vehicle. As shown, vehicle engine 23 is in fluid communication with fluid heater 20 by way of oil line 24 and coolant line 25.

As shown, vehicle engine 23 is in fluid communication with fluid heater 20 by way of oil line 24 and coolant line 25. As shown, engine oil pump 26 is disposed between and is in fluid communication with fluid heater 20 and vehicle engine 23 to pump oil therebetween during the preheating of the vehicle. Engine oil pump 26 is in electrical communication with PCM 13 to receive an oil pump signal from PCM 13 which activates oil pump 26 to pump oil through fluid heater 20 and engine 23. Engine water pump 30 is disposed between and is in fluid communication with fluid heater 20 and engine 23 to pump coolant therebetween during the preheating of the vehicle. Engine water pump 30 is in electrical communication with PCM 13 to receive a water pump signal from PCM 13 which activates water pump 30 to pump coolant through fluid heater 20 and engine 23.

System 11 further includes a heater core 40 which is a heat exchanger through which coolant may pass. Heater core 40 is disposed between and is in fluid communication with fluid heater 20 and engine 23 to allow coolant to pass therethrough. A blower motor 43 is in fluid communication with heater core 40 via air flow line 41. As shown, dual automatic temperature control module 46 is in electrical communication with blower motor 43 and PCM 13 to receive an activation signal from PCM 13 and to activate blower motor 43. In operation, after receiving an activation signal from PCM 13, dual automatic temperature control module 46 sends an ON control signal to blower motor 43 to blow air through air flow lines 45 and across heater core 40. This provides heat from the coolant through air/defroster ducts 42 into the vehicle compartment. As shown, heated back window 50 is in electric communication with dual automatic temperature control module 46 which receives a back window signal to activate heated back window 50. This assists in defrosting the back window.

Figure 2:
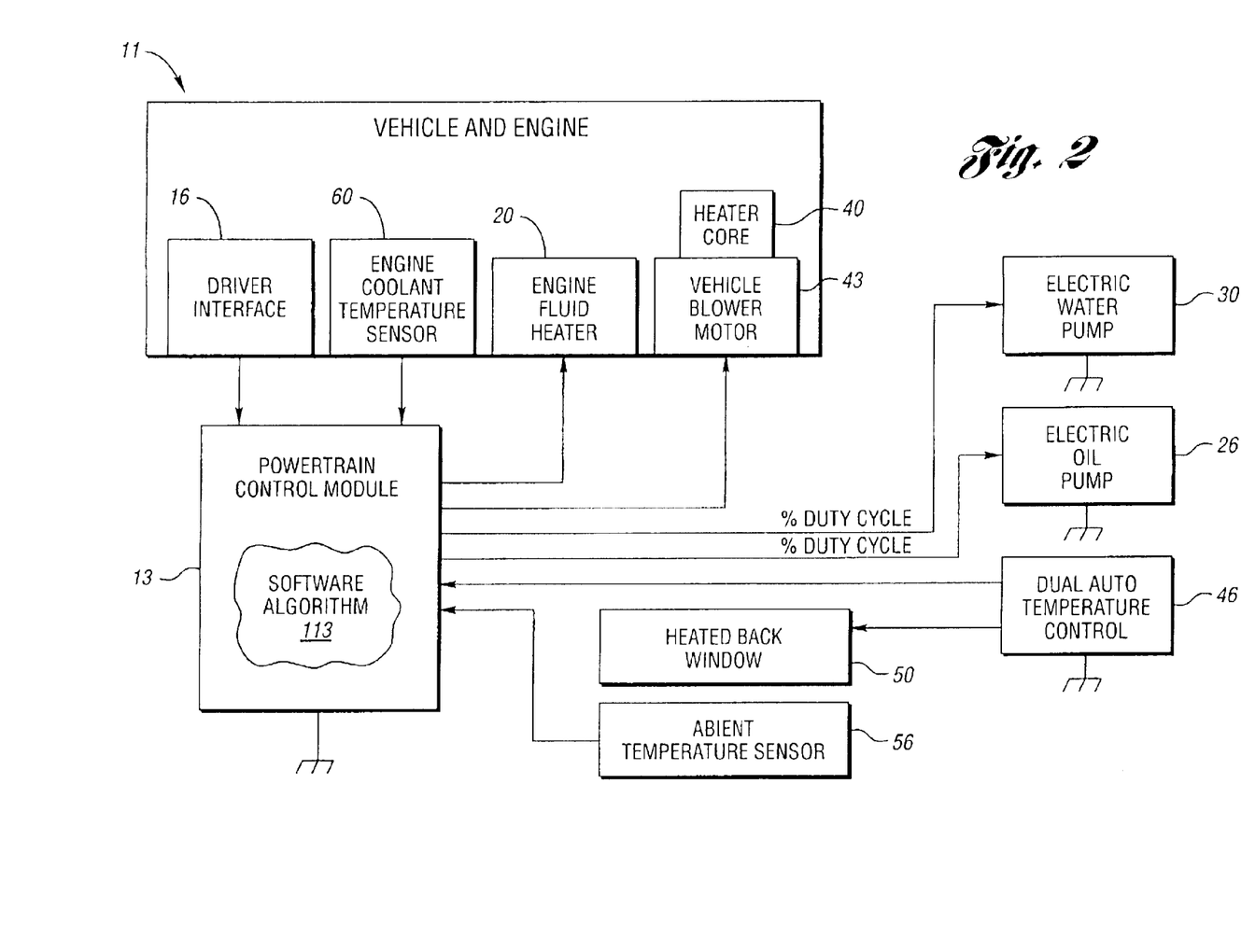
FIG. 2 is a signal flow diagram of the vehicle heating system depicted in FIG. 1.

FIG. 2 illustrates a signal flow diagram of vehicle heating system 11 using the vehicle heating strategy. As shown, PCM 13 includes microprocessor 113 having a software program or algorithm configured therein implementing the vehicle heating strategy. Driver interface 16 receives a programming input from a driver or an occupant of the vehicle defining a minimum engine coolant temperature or vehicle compartment temperature for a preheating strategy. Then, driver interface 16 sends a programming signal to PCM 13 for processing within microprocessor 113.

PCM 13 performs an initial check of vehicle systems, e.g., fuel level of the vehicle, battery level of the vehicle, and in-car temperature of the vehicle compartment. PCM 13 then sends an activation heater signal to fluid heater 20. Fluid heater 20 receives the activation signal from PCM 13 and an electric fuel pump (not shown) draws fuel from the gas tank to run and heat the fluid heater 20.

PCM 13 then activates electric oil pump 26 and electric water pump 30 at a predetermined duty cycle. This is accomplished by sending an oil pump ON signal to oil pump 26 and a water pump ON signal to water pump 30.

Upon receiving the oil pump signal, the oil pump is activated and begins pumping oil between engine 23 and fluid heater 20 (see FIG. 1) to heat engine 23. Upon receiving the water pump signal, the water pump 30 is activated and begins pumping coolant or water between engine 23 and fluid heater 20 (see FIG. 1) to heat engine 23.

At a selected in-car temperature or coolant temperature, dual automatic temperature control module 46 receives an activation signal from PCM 13 to activate blower motor 43, thereby blowing air across heater core 40 through air ducts 42 into the vehicle compartment. This may be accomplished by configuring an ambient temperature sensor 56 to read the ambient temperature outside the vehicle so that microprocessor 113 may compare the in-car temperature with the ambient temperature. In this embodiment, when the ambient temperature is less than the in-car temperature, the dual automatic temperature control module 46 sends an ON control signal to blower motor 43 to activate air flow across heater core 40. PCM 13 may also send a back window signal to control module 46 to activate heated back window 50 to defrost the back window.

Figure 3A:
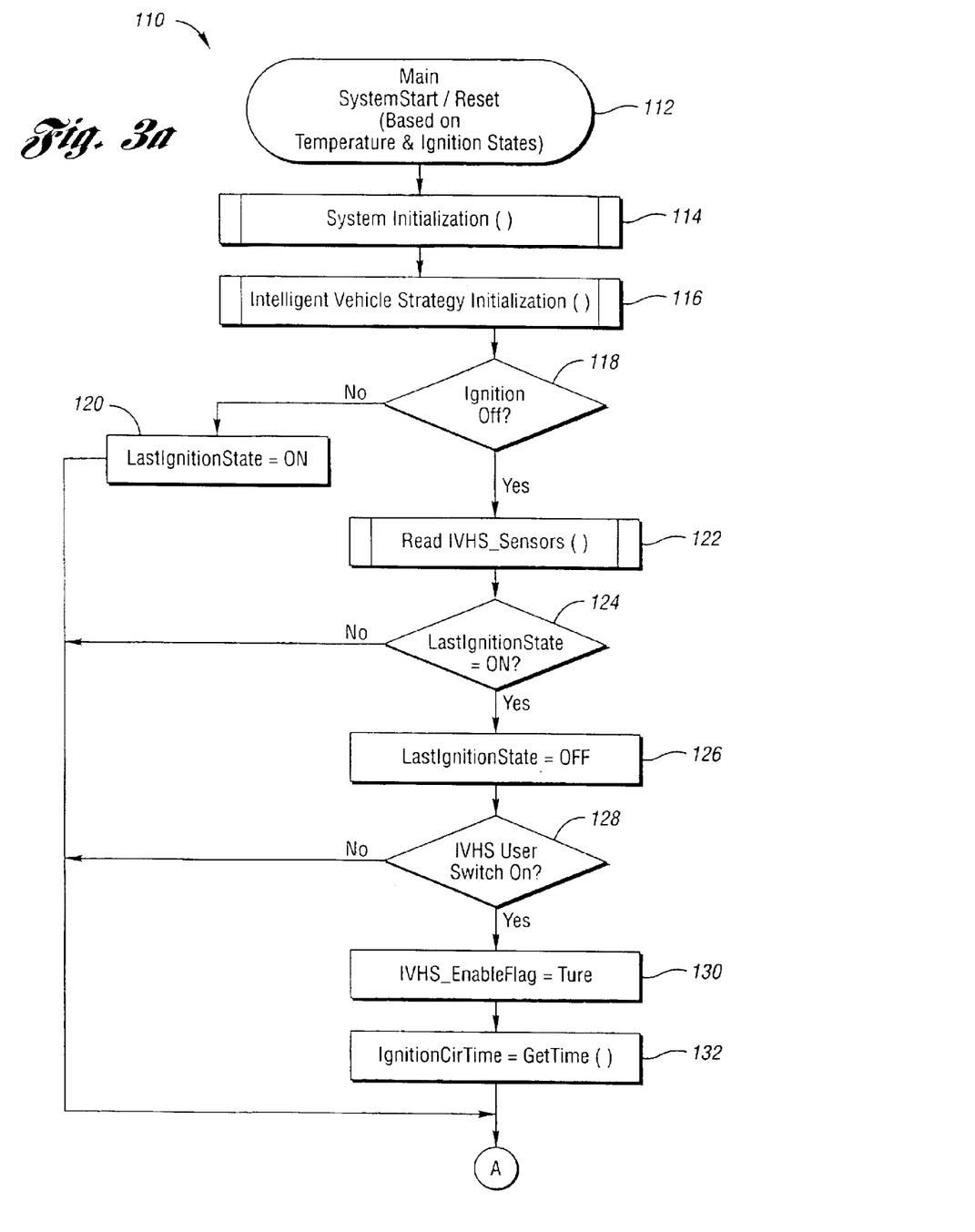
FIG. 3 is a flowchart of one method of preheating a vehicle having the vehicle heating system in accordance with the present invention.
Figure 3B:
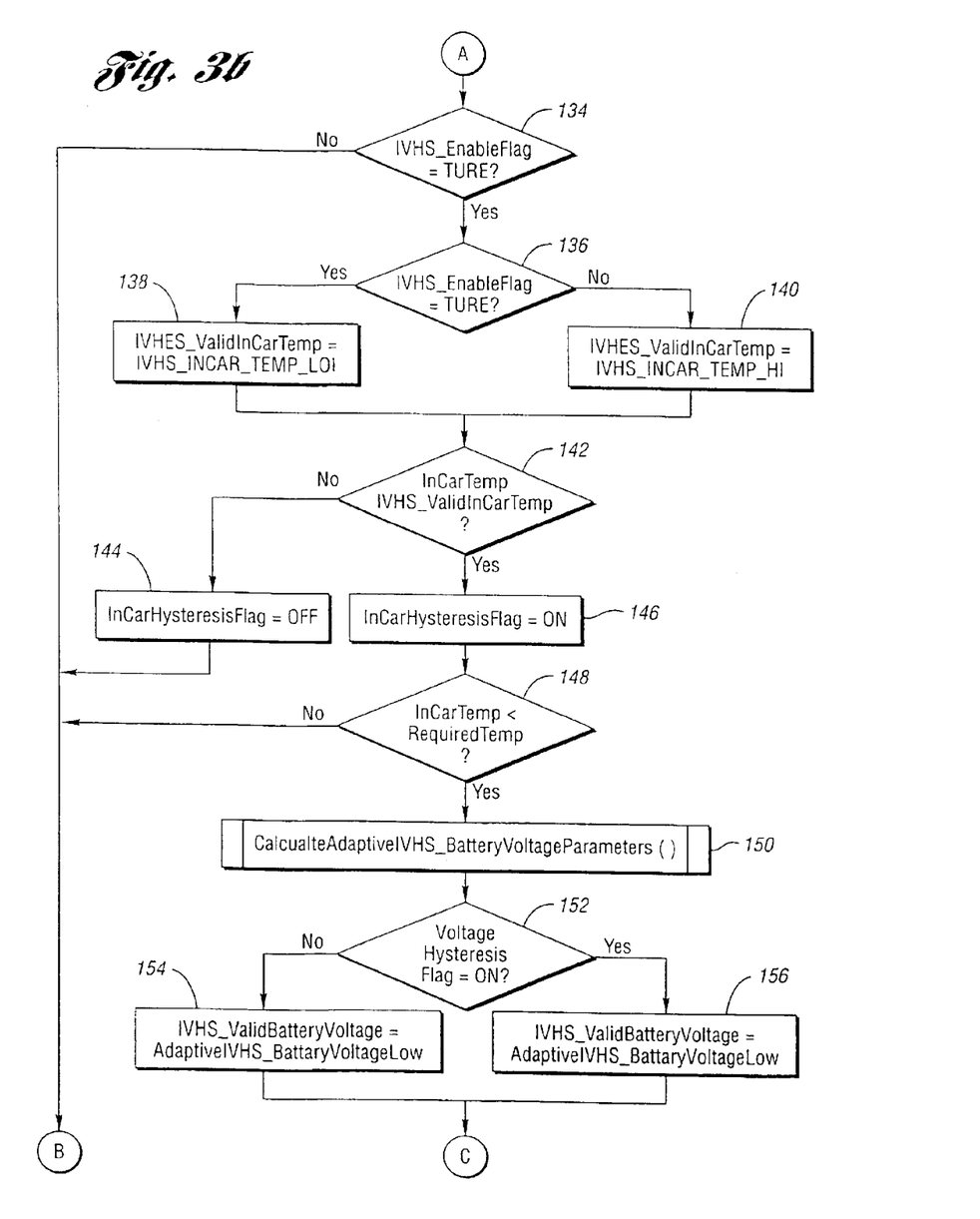
Figure 3C:
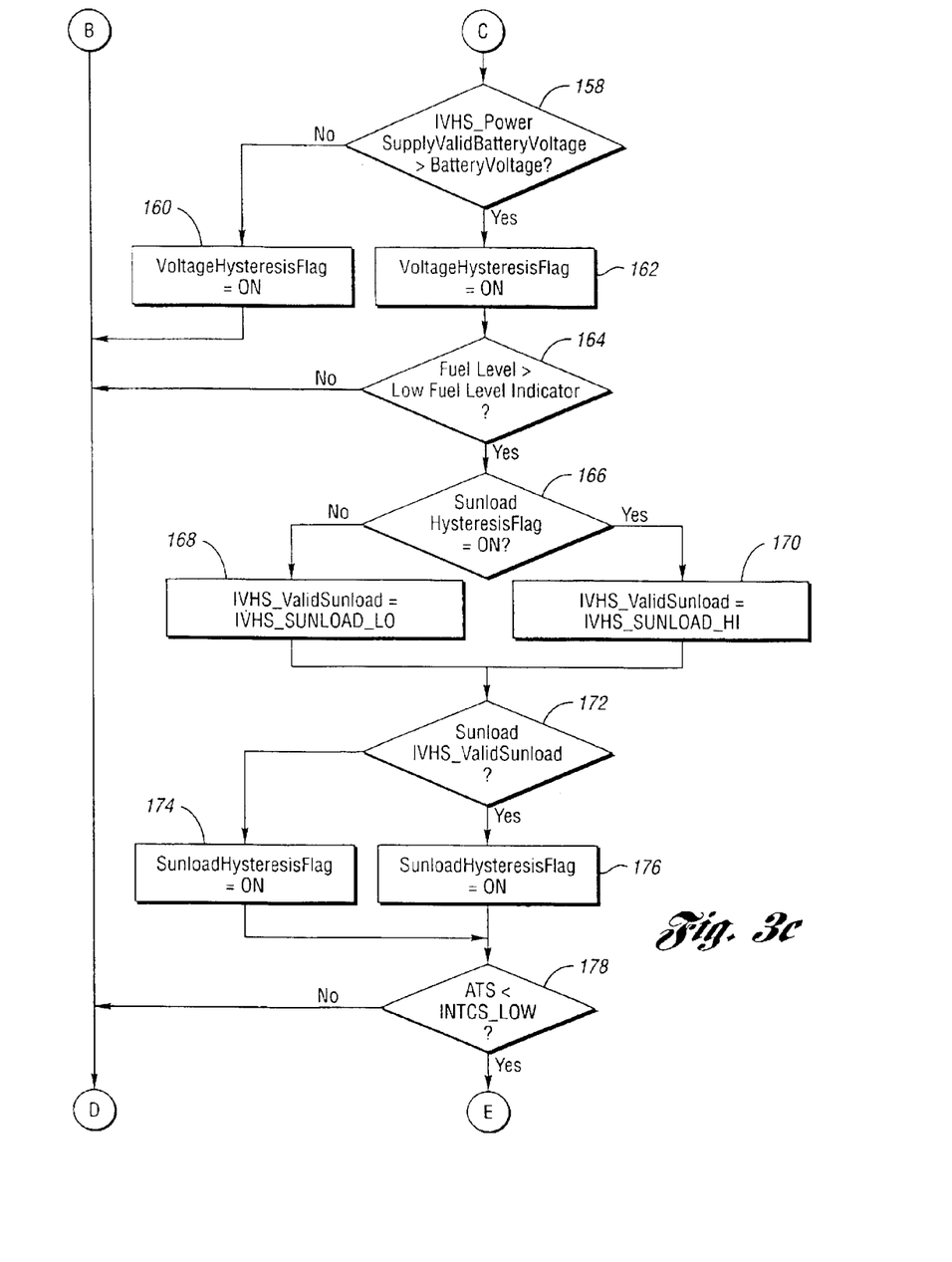
Figure 3D:
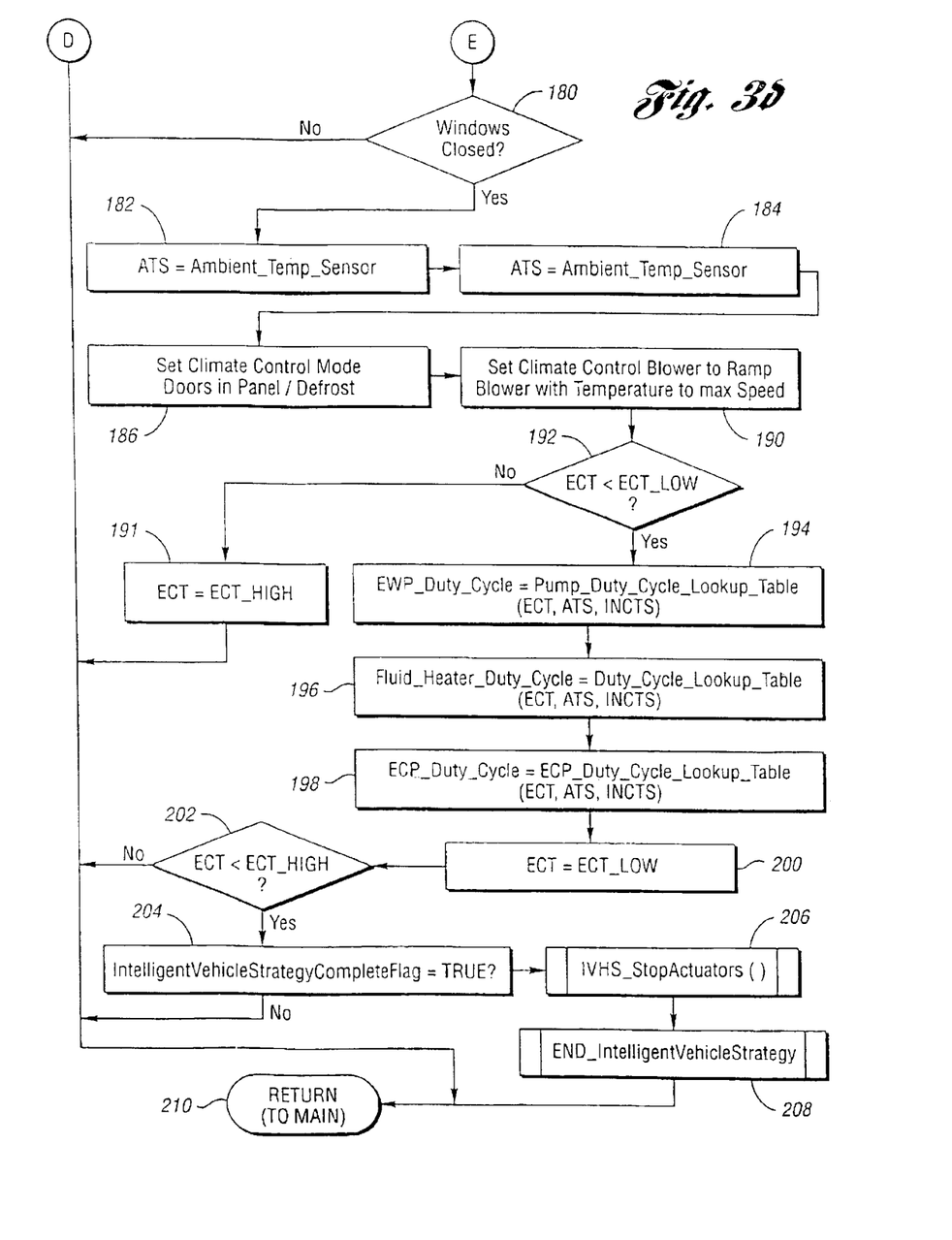

FIGS. 3a–3c illustrate one method 110 of preheating a vehicle engine during non-use of the vehicle, wherein the vehicle heating system described above may be implemented. As shown, method 110 includes starting or resetting the vehicle heating system in box 112 and initializing the heating system in box 114. This may be accomplished by configuring the PCM to start and initialize the heating system at a predetermined time period after the vehicle engine is turned OFF or is not in operation. As shown, method 110 includes initializing the algorithm or strategy configured in the microprocessor in box 116 and determining whether the vehicle engine is turned OFF in box 118.

For programming purposes, it has been found more effective to initialize the preheating system and then the preheating strategy separately. In this embodiment, if the vehicle is in operation and/or turned ON, then method 110 includes placing a last ignition state flag in an "ON" position and continuing to box 134 as shown. On the other hand, if the engine is determined not to be in operation, then the method 110 includes verifying that a driver interface switch of the driver interface is "ON" and vehicle windows are closed. If so, then method 110 includes turning "ON" a vehicle heating system (IVHS) flag in an "ON" position. Then, method 110 includes sensing or reading predetermined vehicle variables in box 122. Vehicle variables may include sensed information such as ambient temperature and an in-car temperature. Method 110 further includes storing the information within microprocessor 113 in box 122. The information stored will be subsequently accessed and used.

It is understood that in one embodiment of the present invention microprocessor 113 includes a software program and/or algorithm implementing variables such as flags or switches which may be placed in an "ON" or "OFF" position depending on a desired circumstance or reading, as known in the art. The PCM may "place," "mark," or "turn" a flag in an "ON" or "OFF" position, for instance. For example, the last ignition state flag may be turned in the "ON" or the "OFF" position depending on whether the PCM determines the engine to be in operation.

As shown, method 110 includes determining whether the last ignition state flag is "ON" in box 124. If not, then the PCM places the last ignition state flag in the "OFF" position in box 126. Then, in box 128, the PCM determines whether a heating system user switch is in an "ON" position. If so, then the PCM marks an enabled flag as "TRUE" in box 130. If not, then the strategy is placed on hold and forwarded to box 134, as described below. Next, the method 110 includes storing a first time period in box 132. Since the strategy, in this embodiment is time-based, the first time is recorded such that vehicle variables may be compared at a subsequent time within the strategy.

In box 134, the PCM verifies that the enabled flag is marked "TRUE." Then, the method 110 includes determining whether an in-car hysteresis flag is turned "ON" in box 136. If the in-car hysteresis flag is "on" as it may be configured during a first cycling of the intelligent vehicle heating strategy, then an in-car temperature variable or valid in-car temperature is set to a low value as represented in box 138. However, if the in-car hysteresis flag is "off," then the in-car temperature variable or valid in-car temperature is set to a high value as represented in box 140. A sensed or measured in-car temperature is compared to the in-car temperature variable, as represented in box 142. If the sensed in-car temperature is greater than the in-car temperature variable, then the in-car hysteresis flag is set to "off" as represented in box 144 and the vehicle heating strategy is terminated. However, if the in-car temperature is less than the in-car temperature variable, then the in-car hysteresis flag is set to "on" as represented in box 146.

Referring to block 136, it is understood that the PCM determines whether a strategy algorithm will use a "low" or "high" temperature constant. Upon initially entering the algorithm, the hysteresis flag is set to "on" which indicates in box 146 that the in-car temperature is lower than a "lo" temperature constant or the valid in-car temperature to continue with the intelligent vehicle heating strategy in box 142. In this embodiment, this indicates that the strategy is not to be executed unless the in-car temperature has fallen below this "lo" temperature constant. If the in-car temperature has exceeded the "lo" temperature constant, then the in-car hysteresis flag is set to "off" in box 144. This indicates that the next time the algorithm is executed, the temperature constant which is compared against the in-car temperature is the "hi" temperature constant. Thus, in this embodiment, when the in-car temperature falls below the in-car temperature "hi" constant the vehicle heating strategy will not function based on the in-car temperature sensor input until it falls below the "lo" constant. In such case, the in-car hysteresis flag is set to "off" and the strategy is disabled till the in-car temperature sensor falls below the "lo" temperature constant. This hysteresis configures the system to not cycle rapidly due to an in-car temperature sensor fluctuating by a few to several degrees. As a result, this protects the system from wear and tear, and provides for more efficient operation.

In this embodiment, the PCM performs most of the strategy steps. However, it is to be understood that any other device or system may be used to perform the functions or steps without falling beyond the scope or spirit of the present invention.

As mentioned above, method 110 further includes determining if the in-car temperature is less than a valid in-car temperature in box 142. The valid in-car temperature may be a pre-set temperature representing a minimum temperature in the vehicle compartment. If so, then an in-car hysteresis flag is turned "ON" in box 146. If not, then the in-car hysteresis flag is turned "OFF" in box 144 and the method 110 is aborted.

Then, the system determines whether the in-car temperature is less than a required temperature in the vehicle compartment in box 148. The required temperature represents a temperature in the vehicle compartment which the driver or occupant may be relatively comfortable, e.g., 70° F. If not, then the system is aborted. If the system determines that the in-car temperature is less than the required temperature in the vehicle, then the PCM proceeds and initiates a battery voltage check to ensure that a power supply to the system is functioning properly in box 150. This may be accomplished by configuring the PCM to gauge the level of voltage remaining in the vehicle battery. It is to be noted that the system depicted in the figures are powered by a power supply system such as the vehicle battery. In box 152, the PCM determines whether a voltage hysteresis flag is "on." If so, then the battery voltage flag is placed on "high" in box 156. If not, then the battery voltage flag is placed on "low" in box 154.

Then, the PCM determines in box 158 whether a power supply valid battery voltage is greater than the actual battery voltage required to operate the system. The power supply valid battery voltage represent a minimum voltage required to operate the system. This verifies that the power supply has relatively enough voltage to operate the system and that the battery will have enough energy to allow the vehicle to be started. This may be accomplished by pre-setting the valid battery voltage value to a minimum value, e.g., 11 volts minimum (scaled with ambient temperature), and storing the valid battery voltage value in the memory of the PCM. Of course, other means may be implemented without falling beyond the scope or spirit of the present invention. If the power supply valid battery voltage is greater than the actual battery voltage, then the PCM places the voltage hysteresis flag in an "OFF" position in box 162. If not, then the PCM places the voltage hysteresis flag "ON" in box 160 and the strategy is aborted.

Method 110 further includes determining whether a fuel level of the vehicle is greater than a low fuel level indicator in box 164. The low fuel level indicator represents a minimum level of fuel which is pre-set in the memory of the PCM. If the fuel level is not greater than the low fuel level indicator, then the strategy is aborted and returned to main in box 112. If the fuel level is greater than the low fuel level indicator, then the PCM determines whether a sun load hysteresis flag is "ON" in box 166. If the sun load hysteresis flag is not "ON," then the system places a valid sun load flag in a "LO" position in box 168. If the sun load hysteresis flag is "ON," then the system places the valid sun load flag in a "HI" position in box 170. Then, the system determines whether the sun load is greater than a predetermined valid sun load in box 172. If not, then the sun load hysteresis flag is turned "ON" in box 174. If so, then the sun load hysteresis flag is turned "OFF" in box 176. The predetermined valid sun load is a value representing a measure of minimum sun light in the vehicle compartment based on a rationale that at a measure greater than the predetermined valid sun load will raise the in-car temperature substantially to negate the purpose of preheating the vehicle compartment.

Method 110 further includes determining whether the ambient temperature is less than an in-car temperature low threshold in box 178. If so, then the PCM determines whether the vehicle windows are closed in box 180. If the ambient temperature is not less than the in-car temperature, then the strategy is aborted and returned to main in box 112. The in-car temperature low threshold is a threshold value which represents a minimum temperature inside the vehicle compartment, e.g., 50° F. Thus, an in-car temperature falling below the in-car temperature low threshold activates the PCM to continue the strategy.

In boxes 182 and 184, the PCM accesses the ambient temperature and the in-car temperature previously stored in the PCM memory in box 122. In this embodiment, the PCM via the Dual Automatic Temperature Control Module sets a climate control mode for the back window and sets a climate control blower at a selected speed in boxes 186 and 190. The speed of the climate control blower is based on a selected in-car compartment temperature determined by a driver or an occupant of the vehicle.

Then, the PCM determines whether the engine coolant temperature is less than the engine coolant low threshold in box 192. In this embodiment, the engine coolant temperature sensor reads the engine coolant temperature. A temperature signal indicative of the temperature is received by the PCM. The PCM compares the engine coolant temperatures with the engine coolant low threshold, e.g., 50° F. If the engine coolant temperature is not less than the low threshold, then the PCM places the engine coolant temperature flag at "high" in box 191. If the system determines that the engine coolant temperature is less than the engine coolant temperature low threshold, then the engine water pump is activated in box 194, the fluid heater is activated in box 196. The engine oil pump is then activated in box 198.

Then, at a subsequent time period, the PCM determines whether the engine coolant temperature is greater than an engine coolant temperature high threshold in box 202. It is to be understood that the first time period and the subsequent time period mentioned above may represent any time or time difference without falling beyond the scope or spirit of the present invention. The engine coolant temperature high threshold is a maximum temperature of the engine coolant. If not, then the strategy continues to run and is returned to the main loop in box 112. If so, then the strategy places a vehicle strategy complete flag in a "TRUE" position in box 204. Then, the PCM stops the system devices and stops the strategy in boxes 206 and 208. Method 110 further includes resetting the system as in box 112.

In use, the vehicle heating system allows a vehicle engine and compartment to remain within a selected temperature range as desired. A driver of a vehicle may start the vehicle and comfortably operate the vehicle, immediately after start-up, without cold engine wear or start-up concerns.

While the invention has been described in terms of preferred embodiments, it will be understood, of course, that the invention is not limited thereto since modifications may be made by those skilled in the art, particularly in light of the foregoing teachings.

What is claimed is:

1. A method of preheating a vehicle engine during non-use of the vehicle, the method comprising:

initializing the preheating strategy;

determining whether the engine is off;

sensing an in-car temperature of the vehicle, if the engine is determined to be off;

sensing an energy supply of the vehicle, if the in-car temperature is less than a required interior temperature;

comparing the energy supply to a minimum energy level;

sensing ambient temperature if the energy supply is greater than the minimum energy level;

setting climate controls, if ambient temperature is less than the in-car temperature;

sensing an actual engine coolant temperature at a first time period, if ambient temperature is less than the in-car temperature;

activating an engine water pump of a vehicle, if the actual engine coolant temperature is determined to be less than a minimum engine coolant temperature;

activating a fluid heater of the vehicle, if the actual engine coolant temperature is less than the minimum engine coolant temperature;

activating an engine oil pump after fluid heater activation;

receiving feedback indicative of actual engine coolant temperature at a subsequent time period;

deactivating the preheating strategy, if the actual engine coolant temperature is greater than the maximum engine coolant temperature at the subsequent time period.

2. The method of claim 1 wherein the step of sensing the energy supply of the vehicle includes:

comparing the in-car temperature to a required interior temperature of the vehicle;

sensing an amount of a power supply of the vehicle, if the in-car temperature is determined to be less than a the required interior temperature;

comparing the amount of the power supply to a minimum power level; and sensing a fuel supply of the vehicle, if the in-car temperature is less than the required interior temperature.

3. The method of claim 1 wherein the stop of sensing ambient temperature includes comparing the fuel supply to the minimum fuel level.

4. The method of claim 1 wherein the step of setting climate controls includes comparing the ambient temperature to the in-car temperature.

5. The method of claim 1 wherein the step of activating the engine water pump of the vehicle includes comparing the actual engine coolant temperature to the minimum engine coolant temperature.

6. The method of claim 1 wherein the step of activating the fluid heater of the vehicle includes comparing the actual engine coolant temperature to the minimum engine coolant temperature.

7. The method of claim 1 wherein the step of deactivating the preheating strategy includes comparing the actual engine coolant temperature to the maximum engine coolant.

8. A system for preheating a vehicle having a vehicle engine and compartment during non-use of the vehicle, the system comprising:

a powertrain control module for receiving a programming input defining a minimum engine coolant temperature of a preheating strategy and for activating the preheating strategy to heat the engine;

a fluid heater for heating engine coolant and oil, the fluid heater being in electrical communication with the powertrain control module and in fluid communication with the vehicle engine;

an electric water pump for pumping engine coolant between the engine and the fluid heater the electric water pump being in electrical communication with the powertrain control module and in fluid communication with the fluid heater and the vehicle engine;

an electric oil pump for pumping engine oil between the engine and the fluid heater, the electric oil pump being in electrical communication with the powertrain control module and in fluid communication with the fluid heater and the vehicle engine;

a heater core for receiving coolant therethrough from the vehicle engine, the heater core being in fluid communication with the vehicle compartment;

a blower motor in electrical communication with the powertrain control module and in fluid communication with the heater core to blow air across the heater core for heating the vehicle compartment.

9. A method of preheating a vehicle engine during non-use of the vehicle, the method comprising:

receiving a programming input defining a minimum engine coolant temperature of a preheating strategy;

initializing the preheating strategy based on the programming input;

sensing an energy source of the vehicle to run the preheating strategy;

sensing an engine coolant temperature of the vehicle at a first time period;

activating the preheating strategy to heat the engine by activating a fluid heater and an engine oil pump of the vehicle, if the engine coolant temperature is lower than the minimum engine temperature;

receiving feedback indicating the engine coolant temperature at a subsequent time period;

deactivating the preheating strategy, if the engine coolant temperature is greater than a maximum temperature at the subsequent time period;

wherein the step of activating the preheating strategy includes activating a fluid heater of the vehicle, if the engine coolant temperature is less than the minimum engine coolant temperature; and wherein the step of activating the preheating strategy includes activating an engine oil pump after fluid heater activation.

* * * * *